(12) United States Patent
Safrai et al.

(10) Patent No.: US 9,219,659 B1
(45) Date of Patent: *Dec. 22, 2015

(54) POLICY CONTROL LIST KEYS FOR NETWORK DEVICES

(71) Applicant: Marvell Israel (M.I.S.L) Ltd., Yokneam (IL)

(72) Inventors: Uri Safrai, Haifa (IL); Gil Levy, Hod Hasharon (IL)

(73) Assignee: MARVELL ISRAEL (M.I.S.L.) LTD., Yokneam (IL)

( * ) Notice: Subject to any disclaimer, the term of this patent is extended or adjusted under 35 U.S.C. 154(b) by 181 days.

This patent is subject to a terminal disclaimer.

(21) Appl. No.: 13/692,828

(22) Filed: Dec. 3, 2012

Related U.S. Application Data

(60) Provisional application No. 61/566,343, filed on Dec. 2, 2011.

(51) Int. Cl.
*H04L 29/06* (2006.01)
*H04L 12/24* (2006.01)

(52) U.S. Cl.
CPC ................................. *H04L 41/5041* (2013.01)

(58) Field of Classification Search
CPC  H04W 12/04; H04L 49/3009; H04L 29/0653
USPC .................................. 370/230, 235, 252, 392
See application file for complete search history.

(56) References Cited

U.S. PATENT DOCUMENTS

| 6,356,951 | B1 * | 3/2002 | Gentry, Jr. | 709/250 |
|---|---|---|---|---|
| 8,031,709 | B2 * | 10/2011 | Alexander, Jr. | 370/389 |
| 8,639,875 | B1 * | 1/2014 | Estan | 711/108 |
| 2009/0207857 | A1 | 8/2009 | Alexander, Jr. | |
| 2011/0255540 | A1 * | 10/2011 | Mizrahi et al. | 370/392 |

OTHER PUBLICATIONS

Office Action in related U.S. Appl. No. 14/174,963, dated Aug. 22, 2014 (29 pages).

* cited by examiner

*Primary Examiner* — Shaq Taha
*Assistant Examiner* — Sasha Cintron Pacheco

(57) ABSTRACT

In a method of processing a packet in a network device, a packet is received at an ingress port of the network device. A metadata set for the packet is generated. The metadata set includes data generated by the network device for the packet. The metadata set is stored in a memory of the network device. A subset of data included in the stored metadata set is used to generated a key corresponding to the packet. The subset of data does not include all of the data included in the stored metadata set. A processing action for the packet is determined based on the key and the packet is processed by the network device using the processing action.

16 Claims, 12 Drawing Sheets

| UDB NUMBER | Anchor | Offset (Bytes) |
|---|---|---|
| 0 | L2 | 0 |
| 1 | L2 | 1 |
| 2 | Metadata | 7 |
| 3 | Metadata | 11 |
| 4 | L3 | 0 |
| 5 | L3 | 1 |
| ⋮ | | |
| 57 | L3 | 0 |
| 58 | L3 | 1 |
| 59 | Metadata | 5 |

FIG. 4

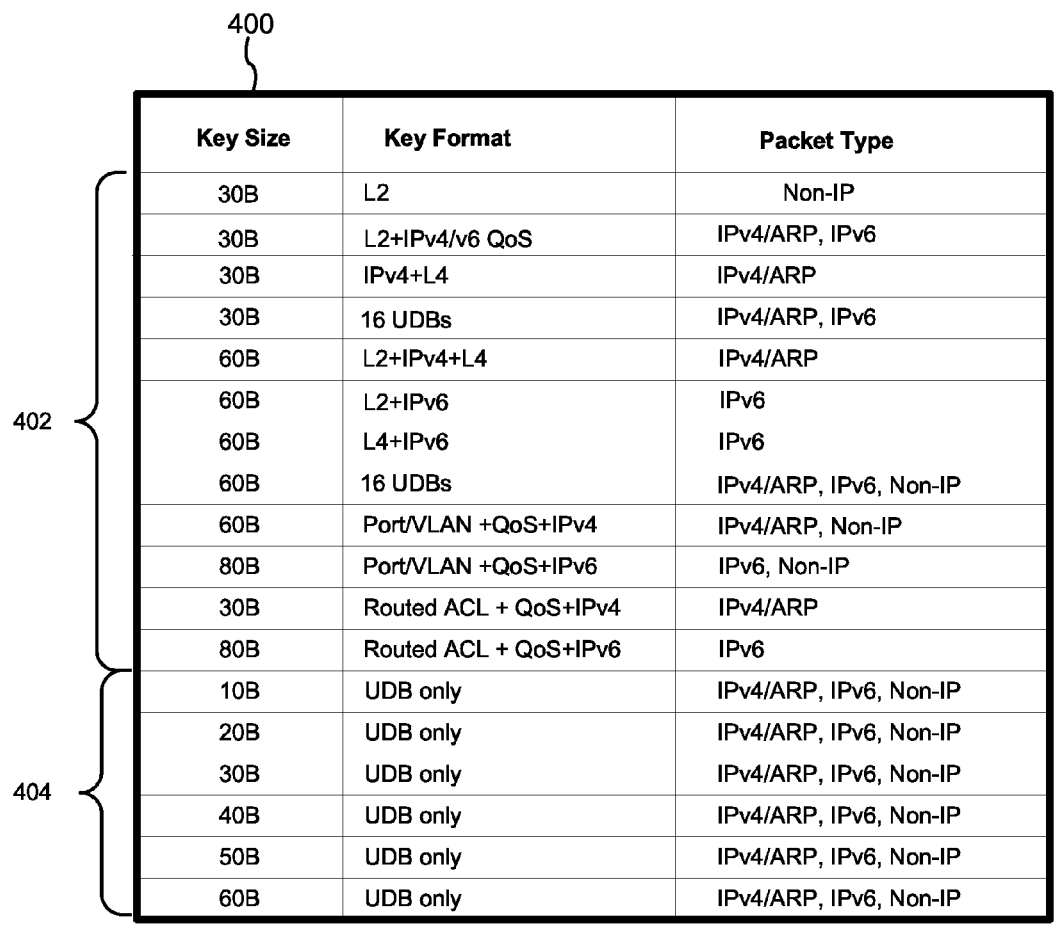

| Key Size | Key Format | Packet Type |
|---|---|---|
| 30B | L2 | Non-IP |
| 30B | L2+IPv4/v6 QoS | IPv4/ARP, IPv6 |
| 30B | IPv4+L4 | IPv4/ARP |
| 30B | 16 UDBs | IPv4/ARP, IPv6 |
| 60B | L2+IPv4+L4 | IPv4/ARP |
| 60B | L2+IPv6 | IPv6 |
| 60B | L4+IPv6 | IPv6 |
| 60B | 16 UDBs | IPv4/ARP, IPv6, Non-IP |
| 60B | Port/VLAN +QoS+IPv4 | IPv4/ARP, Non-IP |
| 80B | Port/VLAN +QoS+IPv6 | IPv6, Non-IP |
| 30B | Routed ACL + QoS+IPv4 | IPv4/ARP |
| 80B | Routed ACL + QoS+IPv6 | IPv6 |
| 10B | UDB only | IPv4/ARP, IPv6, Non-IP |
| 20B | UDB only | IPv4/ARP, IPv6, Non-IP |
| 30B | UDB only | IPv4/ARP, IPv6, Non-IP |
| 40B | UDB only | IPv4/ARP, IPv6, Non-IP |
| 50B | UDB only | IPv4/ARP, IPv6, Non-IP |
| 60B | UDB only | IPv4/ARP, IPv6, Non-IP |

| UDB number in this lookup | UDB number in UDB pool |
|---|---|
| 0 | 0 |
| 1 | 1 |
| 2 | 15 |
| 3 | 59 |
| . | . |
| . | . |
| . | . |
| . | . |
| . | . |
| 39 | 30 |

600

630

650

UDBs numbered with respect to the UDB ordering in UDB pool

FIG. 7A
700
| | Generated Data |
|---|---|
| 0 | PCL-ID |
| 1 | |
| 2 | eVLAN |
| 3 | |
| 4 | Source ePort |
| 5 | |
| 6 | VID1+UP1 |
| 7 | |
| 8 | QoS Profile |
| 9 | |
| 10 | Flow ID |
| 11 | |
| 12 | VRF-ID |
| 13 | |
FIG. 7B
720
| UDB NUMBER | Generated Data |
|---|---|
| 0 | PCL-ID[7:0] |
| 1 | PCL-ID[9:8] |
| 2 | eVLAN[9:0] |
| 3 | 0 |
| 4 | 0 |
| 5 | 0 |
| ⋮ | ⋮ |
| 39 | VRF-ID[11:8] |
FIG. 7C
730 — UDBs numbered with respect to UDB ordering in the key 730
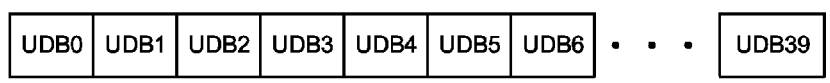
750

FIG. 9

| Key Size | Key Format | Packet Type |
|---|---|---|
| 30B | L2 | Non-IP |
| 30B | L2+IPv4/v6 QoS | IPv4/ARP, IPv6 |
| 30B | IPv4+L4 | IPv4/ARP |
| 60B | L2+IPv4+L4 | IPv4/ARP |
| 60B | L2+IPv6 | IPv6 |
| 60B | L4+IPv6 | IPv6 |
| 60B | RACL/VACL IPv4 | IPv4/ARP, Non-IP |
| 80B | RACL/VACL IPv6 | IPv6, Non-IP |
| 10B | UDB only | IPv4/ARP, IPv6, Non-IP |
| 20B | UDB only | IPv4/ARP, IPv6, Non-IP |
| 30B | UDB only | IPv4/ARP, IPv6, Non-IP |
| 40B | UDB only | IPv4/ARP, IPv6, Non-IP |
| 50B | UDB only | IPv4/ARP, IPv6, Non-IP |
| 60B | UDB only | IPv4/ARP, IPv6, Non-IP |

US 9,219,659 B1

POLICY CONTROL LIST KEYS FOR NETWORK DEVICES

CROSS-REFERENCE TO RELATED APPLICATION

This disclosure claims the benefit of U.S. Provisional Patent Application No. 61/566,343, filed Dec. 2, 2011, entitled "Policy Control List Keys for Switch Devices," the disclosure of which is hereby expressly incorporated herein by reference in its entirety.

FIELD OF THE DISCLOSURE

The present disclosure relates generally to communication networks and, more particularly, to network devices such as switches, routers, and edge devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network devices, such as network switches, routers, edge devices and the like include policy control architectures in which one or more actions to be performed on a packet are determined based on information included in or associated with the packet. For example, such devices are sometimes configured to generate policy keys for packets based on information included in the packets, and to utilize the keys to determine actions to be performed on the packets. Such keys are typically preconfigured in the network devices such that the keys are generated using packet information extracted from predefined fixed locations in the data packets. Consequently, generation of policy keys in such network devices is relatively inflexible and provides users of the network devices very limited flexibility in implementing policy control applications.

SUMMARY

In an embodiment, a method of processing a packet in a network device includes receiving a packet at an ingress port of the network device and generating a metadata set for the packet, wherein the metadata set includes data generated by the network device for the packet. The method also includes storing the metadata set in a memory of the network device. The method further includes generating, using a subset of data included in the stored metadata set, a key corresponding to the packet, wherein the subset of data does not include all of the data included in the stored metadata set. The method additionally includes determining, based on the key, a processing action for the packet and processing, by the network device, the packet using the processing action.

In another embodiment, a network device and a poluraty of ports and a forwarding engine coupled to the plurality of ports. The forwarding engine comprises a metadata generator configured to generate a metadata set for a packet, wherein the metadata set includes data generated by the network device for the packet and store the metadata set in a memory of the network device. The forwarding engine further comprises a policy control engine configured to generate, using a subset of data included in the stored metadata set, a key corresponding to the packet, wherein the subset of data is less than all data included in the stored metadata set. The policy control engine is further configured to determine, based on the key, a processing action for the packet. The forwarding engine is configured to process the packet according to the determined processing action.

In yet another embodiment, a method of processing a packet in a network device includes receiving a packet at an ingress port of the network device and populating, with data included in or associated with the packet, a set of user defined bytes corresponding to the packet. The method also includes selecting, form the set of user defined bytes, one or more user defined bytes to be used in a key for the packet and specifying an ordering of the selected user defined bytes to be used for generating the key. The method further includes generating the key using the selected user defined bytes and according to the ordering of the selected user defined bytes specified for the key. The method additionally includes determining, based on the key, a processing action for the packet, and processing, by the network device, the packet using the processing action.

In still another embodiment, a network device, comprises a plurality of ports and a forwarding engine coupled to the plurality of ports. The forwarding engine comprises a user define byte (UDB) configuration unit configured to populate, with data included in or associated with the packet, a set of user defined bytes corresponding to the packet. The forwarding engine further comprises a policy control engine configured to select one or more user defined bytes from the set of user defined bytes and generate a key for the packet using the selected user defined bytes and according to an ordering, of the selected user defined bytes, specified for the key. The policy engine is additionally configured to determine, based on the key, a processing action for the packet. The forwarding engine is configured to process the packet using the processing action.

To be completed when the claims are finalized

BRIEF DESCRIPTION OF THE DRAWINGS

FIG. 3 illustrates an example UDB set defined for a particular packet type supported by a network device, according to one embodiment.

FIG. 4 depicts a table listing various ingress policy key formats available in a network device, in an embodiment.

FIG. 7A illustrates an example UDB replacement table that lists device-generated data for a packet that can be selected to replace UDBs in a key, according to an embodiment.

FIG. 7B illustrates an entry of a UDB replacement configuration table configured for replacing UDBs in a key with data generated for a packet by a network device, according to an embodiment.

FIG. 7C illustrates a UDB only key generated for a packet, and the generated UDB only key in which UDBs are replaced, according to the table entry of FIG. 7B, with data generated for the packet by the network device, according to an embodiment.

FIG. 9 depicts a table listing various egress policy key formats available in a network device, in an embodiment.

DETAILED DESCRIPTION

Figure 1:
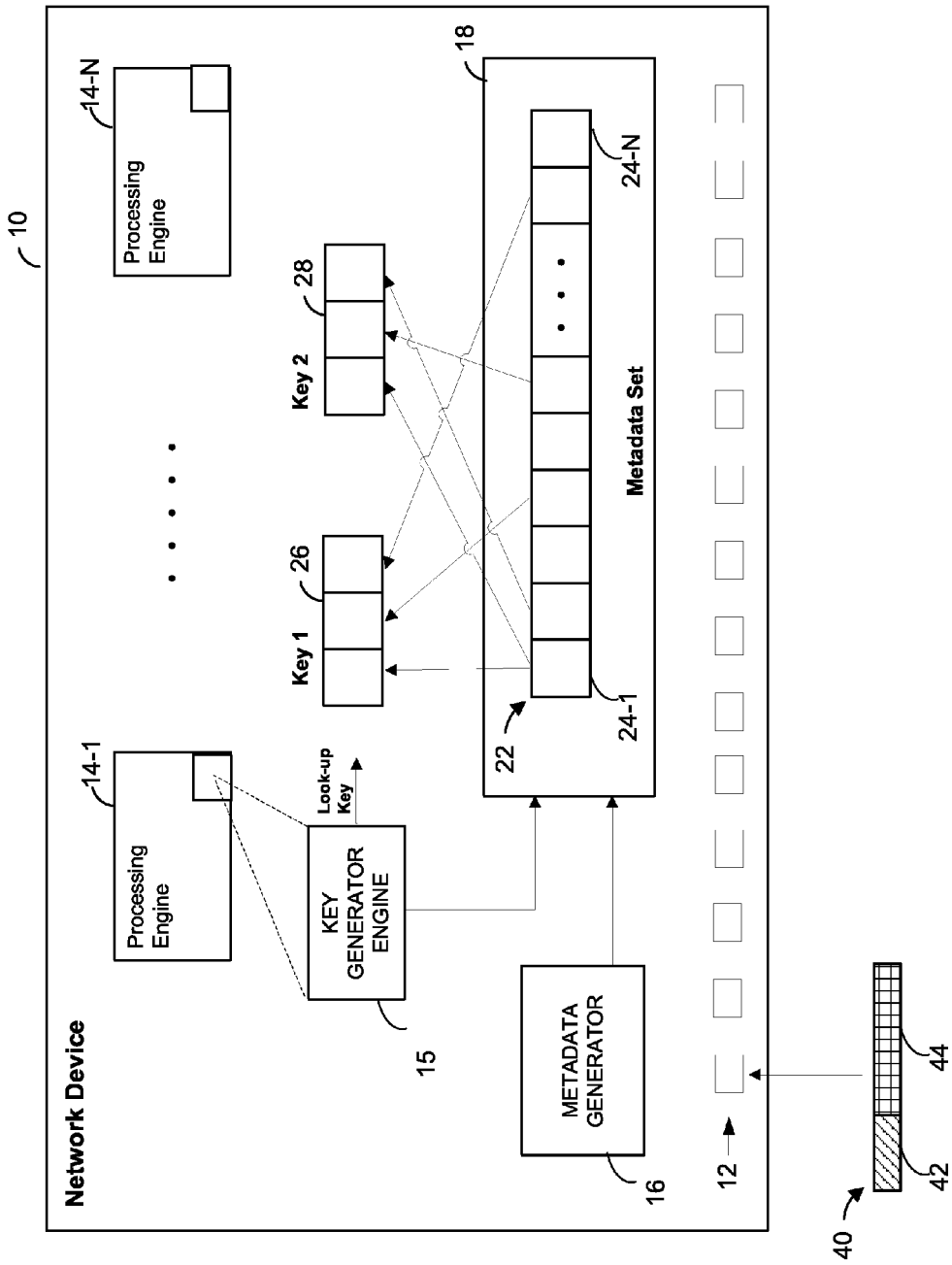
FIG. 1 is a simplified block diagram of an example network device configured to utilize user defined data for generating look-up keys, according to an embodiment.

FIG. 1 is a simplified block diagram of an example network device 10 configured to utilize user defined data for generating look-up keys, according to an embodiment. The network device 10 includes one or more processing engines 12 and a plurality of ports 14, and each port 14 is coupled to a respective communication link associated with a communication network. The one or more processing engines 12 generally process packets ingressing via ports 14 including one or more of i) making forwarding decisions (i.e., for egress via ports 14), ii) determining whether a packet should be trapped or mirrored to another processor (not shown) for further analysis, iii) determining whether a packet should be discarded, etc. In some embodiments, a processing engine 12 determines one or more processing actions to be performed on a packet by generating one or more lookup keys (the terms "key" and "lookup key" as used herein are interchangeable) for the packet and utilizing the one or more lookup keys to determine one or more actions to be performed on the packet. To this end, each processing engine 12 includes a key generator engine 15 configured to generate a key for a packet based on various information included in or associated with the packet, for example based on packet information included in a header of the packet. In some embodiments, when generating a key for a packet, the key generator 15, additionally or alternatively, includes in the key, packet information not included in a header of the packet, but determined, calculated, or otherwise generated for the packet based on the processing of the packet by the network device 10 and/or packet information specific to the network device 10 (e.g., the ingress port of the network device 10 at which the packet is received, the egress port of the network device 10 via which the packet is to be transmitted, etc.).

As will be explained in more detail below in connection with FIG. 1A, to allow the key generator engine 15 to utilize packet information not actually included in the packet but rather determined, calculated, or otherwise generated for the packet during processing of the packet by the network device 10, in an embodiment, the network device 10 includes a metadata generator 16 that generates, for each packet processed by the network device 10, a metadata set that includes such packet information, and stores the generated metadata set in a memory (e.g., the memory 18 or other suitable memory) included in the network device 10. The key generator engine 15 then utilizes the stored packet information for generation of a lookup key for the packet.

Figure 1A:
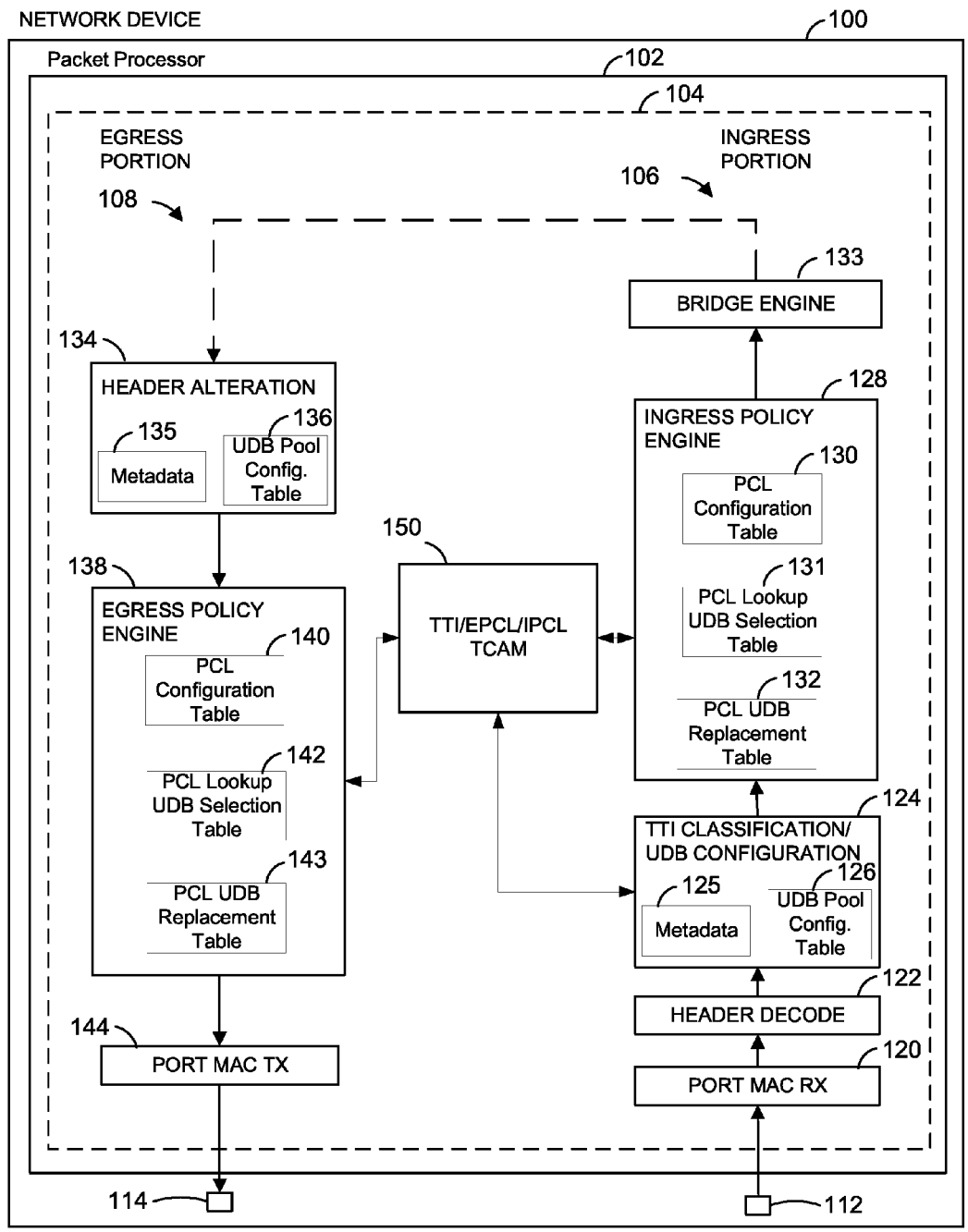
FIG. 1A is a block diagram of an example network device configured to perform policy process control using configurable keys, in accordance with an embodiment of the present disclosure.

To better explain generation of a lookup key for a packet to include packet information not included in the packet, FIG. 1A illustrates a packet 40 ingressing the network device 10 and several keys 26, 28 generated for the packet. In an embodiment, when the packet 40 is received and partially processed by the network device 10, the metadata generator 16 generates a metadata set 22 for the packet and stores the metadata set 22 in a memory of the network device 10 (e.g., the memory 18 or other suitable memory included in the network device 10). The metadata set 22 includes a plurality of fields 24, and each of the fields 24 includes packet information determined for the packet as a result of processing the packet by the network device 10. Then, in order to generate a look up key for a lookup to be performed for the packet 40, the key generator engine 15 retrieves a subset of the fields 24 from the metadata set 22, and generates the lookup key by ordering the retrieved fields according to a particular ordering specified for the key.

In an embodiment, each key generator 15 is configurable to retrieve a specific subset of fields 24 from the metadata set 22. In some embodiments, a key generator 15 retrieves the fields 24 that contain information of interest for the particular processing engine 14 and/or for the particular lookup stage for which the key is being generated. Thus, different keys generated for the packet 40 during the processing of the packet 40 by the one or more processing engines 14 include different subsets of the fields 24, in at least some embodiments and/or scenarios. Further, upon retrieving the desired fields 24 from the metadata set 22, a key generator engine 15 generates a particular lookup key according to a suitable ordering of the fields specified for the key. Thus, for example, as illustrated in FIG. 1A, a key 26 generated for the packet 40 includes a different subset of fields 24 compared to the subset of fields 24 included in a key 28 generated for the packet 40, in an embodiment. In one embodiment, the keys 26 and 28 are generated by different ones of key generator engines 15, included in different ones of the processing engines 14. In another embodiment and/or scenario, the keys 26 and 28 are generated by a same key generator engine 15 included in a same processing engine 14. In this embodiment and/or scenario, the keys 26 and 28 are used for different lookup stages in a multi-stage lookup scheme, for example.

FIG. 1A is a block diagram of an example network device 100 that is suitable for use as the network device 10 of FIG. 1, according to one embodiment. In the embodiment illustrated in FIG. 1A, the network device 100 utilizes configurable lookup keys to perform policy control lookups. In general, the network device 100 utilizes policy control to implement certain logic or rules according to which packets received by the network device 100 should be processed. An action or a set of actions to be performed on a packet are then selected based on information included in and/or associated with the packet, according to an embodiment. For example, in an embodiment, the network device 100 is configured to generate a policy key for a packet based on information included in or associated with the packet, and to utilize the policy key to access a memory (e.g., a ternary content based addressable memory (TCAM), a random access memory (RAM), other suitable memory, etc.) to identify action or actions to be performed on the packet based on the generated policy key. In an embodiment, to provide a network engineer or another user of the network device 100 flexibility in generating policy keys for a packet, the network device 100 allows the user to specify user defined bytes (UDBs) to include desired information included in or associated with the packet, and to generate the policy key using the user defined bytes, according to an embodiment.

The network device 100 includes a packet processor 102 which includes a forwarding engine 104 coupled to one or more ingress ports 112 and one or more egress ports 114. In the embodiment of FIG. 1A, the forwarding engine 104 includes an ingress pipeline 106 and an egress pipeline 108 In another embodiment, the forwarding engine 104 is arranged in a non-pipeline manner in which a single processing unit fully processes a packet, for example. The packet processor 102 processes packets ingressing via ports 112 including one or more of i) making forwarding decisions (i.e., determining from which one or more egress via ports 114 a packet should be transmitted), ii) determining whether a packet should be trapped or mirrored to another processor (not shown) for further analysis, iii) determining whether a packet should be discarded, etc.

The ingress 112 and the egress ports 114 are coupled to one or more different networks such as a wide area network (WAN), a local area network (LAN), such as a wired LAN or a wireless LAN, etc. In one embodiment, the ingress physical ports 112 and the egress physical ports 114 of the network device 100 provide multiple 2-way, point-to-point communication links to other devices, such as bridges, other switches in a switching system, endpoints, etc. The packet processor 102 generally transfers packets of data from the ingress physical ports 112 to appropriate egress physical ports 114, in an embodiment. For purposes of clarity, only one ingress port 112 and one egress port 114 are seen in FIG. 1A. In an embodiment, the packet processing pipeline 104 is coupled to, and configured to forward packets among, a plurality of ingress ports 112 and egress ports 114. Further, in some embodiments, at least some physical ports are input/output ports, and at least some ingress physical ports 112 and egress physical ports 114 correspond to the same physical ports.

As seen in FIG. 1A, the ingress portion 106 and the egress portion 108 each include a plurality of processing units coupled in series. Generally, each unit of a pipeline optionally processes a packet or a packet descriptor corresponding to the packet and then passes the packet or the packet descriptor to the next unit in the pipeline. A packet descriptor includes some information from the packet, such as some or all of the header information of the packet, in an embodiment. In some embodiments, the packet descriptor includes other information as well such as an indicator of where the packet is stored in a memory associated with the network device 100. For ease of explanation, the term "packet" hereinafter is used to refer to a packet itself or to a packet descriptor associated with the packet. Each unit in the pipeline 104 may or may not process a particular packet. For example, in some instances, a unit simply passes a packet onto the next unit in the pipeline 104. In the example embodiment of FIG. 1A, the last unit of the ingress portion 106 passes the packet to the first unit of the egress portion 108, in an embodiment. In some embodiments, the ingress pipeline portion 106 and/or the egress pipeline portion 108 includes one or more additional processing units which are omitted from FIG. 1A for simplicity and ease of explanation.

In the example embodiment of FIG. 1A, the ingress portion 106 includes a port media access control (MAC) receiver unit 120 coupled to the ingress physical port 112. The port MAC receiver unit 120 generally implements media access control functions. The port MAC receiver unit 120 also generally interfaces the ingress portion 106 with a particular physical ingress port of the network device 100 (i.e., if the network device 100 includes a plurality of physical ingress ports, the network device 100 includes a plurality of respective port MAC receiver units 120). In another embodiment, one port MAC receiver unit 120 interfaces the ingress portion 106 with a plurality of physical ingress ports (not shown for purposes of clarity) of the network device 100.

A header decode unit 122 is coupled to the port MAC receiver unit 120 and generally decodes the header of each packet received via the ingress physical port or ports 112. This may include parsing or identifying different segments of the header for use by subsequent units in the ingress pipeline 106 and, optionally, units in the egress pipeline 108.

A tunnel termination and interface (TTI) classification/ user defined byte (UDB) configuration unit 124 is coupled to the header decode unit 122. In an embodiment, the TTI classification/UDB configuration unit 124 performs a lookup function (a tunnel termination interface (TTI) lookup) used for tunnel termination identification and/or classifying a logical interface according to L2 or L3 header fields. In an embodiment, the TTI lookup indicates that the packet should be associated with one or more TTI actions, such as assigning a virtual LAN (VLAN) identifier, quality of service (QoS) parameters, etc., to the packet. In an embodiment, if the TTI lookup utilizes a source port indicator, the local source port indicator is utilized.

In an embodiment, the TTI classification/UDB configuration unit 124 performs TTI classification using a TCAM (e.g., the TCAM 150) or other suitable lookup memory, and the TCAM or other suitable memory stores TTI data associated with ingress ports of the packet processor 102. The TTI classification/UDB configuration unit 124 utilizes ingress port indicators to perform TCAM lookups, in an embodiment.

In an embodiment, the TTI classification unit/UDB configuration unit 124 includes or is coupled to a memory storing a UDB pool configuration table 126 which allows a user (e.g., network engineer) to specify a plurality of UDBs for each one of a plurality of packet types supported by the network device 100. The UDBs specified in the UDB pool configuration table 126 are then used for performing policy control in the network device 100, in an embodiment. For example, the UDBs specified in the UDB pool configuration table 126 are used by the network device 100 for generating a policy key for a packet, and the policy key is used to determine one or more processing actions to be performed on the packet, as will be described in more detail below.

Figure 2:
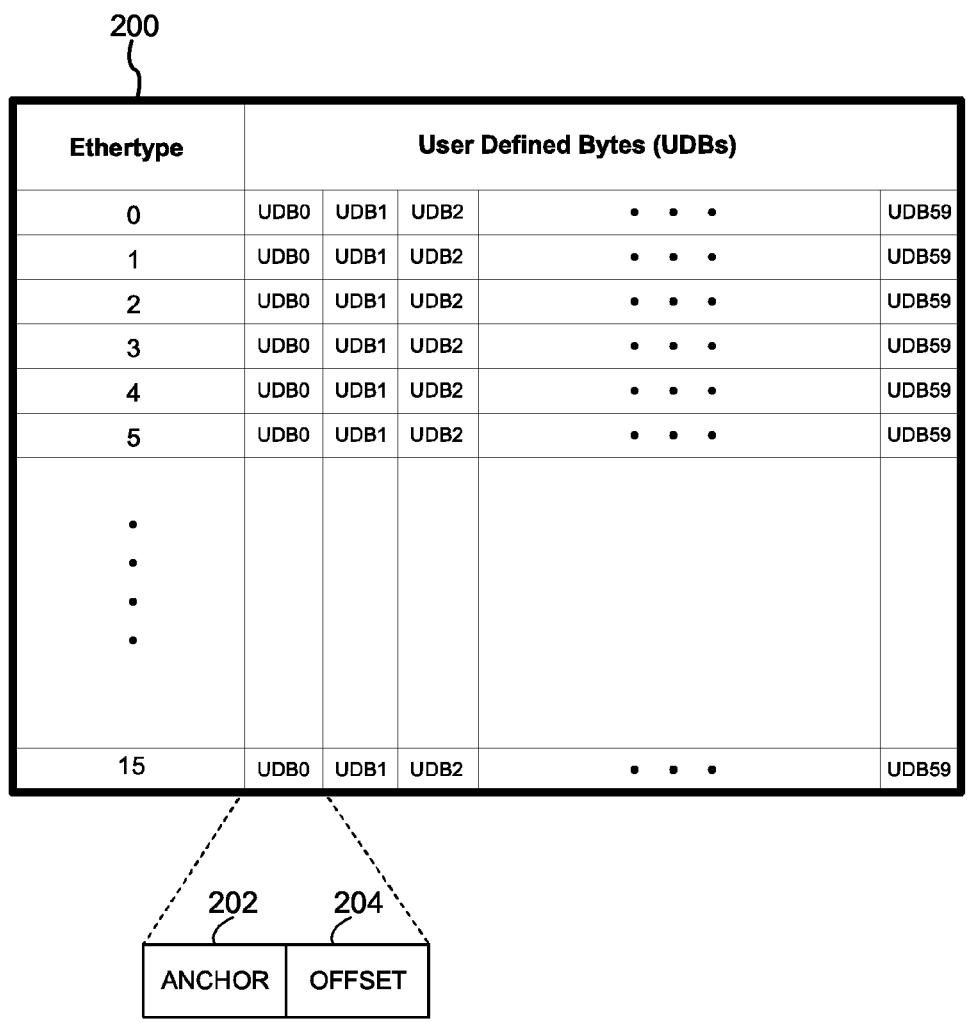
FIG. 2 is an example user defined byte (UDB) configuration table, according to an embodiment.

FIG. 2 is an example UDB configuration table 200, according to an embodiment. The example UDB configuration table 200 corresponds to the UDB configuration table 126 of FIG. 1A, in an embodiment. In an embodiment, a row of the UDB configuration table 200 includes a plurality of entries corresponding to a particular packet type and allows a user to specify UDBs for the particular packet type. Accordingly, entries in the UDB configuration table 200 are indexed according to packet type, in this embodiment. Thus, the UDB configuration table 200 allows a user to define different UDBs for different packet types, in at least some situations. In the example embodiment of FIG. 2, each entry in the UDB configuration table 200 includes an anchor subfield 202 and an offset subfield 204. The anchor subfield 202 specifies a set of data (a "dataset") corresponding to a packet from which a field for the UDB is to be selected, and an offset subfield 204 specifies an offset of the desired field relative to the start of the dataset identified by the anchor subfield 202. At least some datasets correspond to headers of different protocol stack layers associated with a packet, for example, in an embodiment. When the dataset referenced by the anchor subfield 202 corresponds to a header field of a packet, the corresponding offset subfield 204 specifies an offset (e.g., in bytes) within the header field relative to the start of the header field identified by the anchor subfield 202.

To allow a user to specify one or more UDBs in the UDB pool configuration table 200 that include packet information not included in the packet itself, such as packet information determined, calculated, or otherwise generated for the packet based on the processing of the packet by the network device 100 and/or packet information specific to the network device 100 (e.g., the ingress port of the network device 100 at which the packet is received, the egress port of the network device 100 via which the packet is to be transmitted, etc.), the TTI classification/UDB configuration unit 124 generates, for each packet, a metadata set that includes various data related to the packet (e.g., a metadata set 125). In an embodiment, the TTI classification/UDB configuration unit 124 stores the generated metadata set 125 in a memory included in or coupled to the TTI classification/UDB configuration unit 124. In an embodiment, the metadata set 125 is the same as or similar to the metadata set 22 of FIG. 1A. For example, the TTI classification/UDB configuration unit 124 includes a metadata set generator (not shown) same as or similar to the metadata set generator 16 of FIG. 1A, and utilizes the metadata generator to generate the metadata set 125 and to store the metadata set 125 in a memory included in or coupled to the TTI classification/UDB configuration unit 124.

According to an embodiment, the TTI classification/UDB configuration unit 124 allows a user to specify a UDB that includes data from the metadata set 125, for example by using the metadata set 125 as a dataset referenced by an anchor specified for the UDB. In general, a metadata set for a packet is an ordered set of data generated for the packet by the TTI classification/UDB configuration unit 124 and/or by other processing units included in the packet processor 102, such as the PORT MAC RX unit 120, the header decode unit 122, a time-stamping unit (not shown), etc., or to include other data associated with the packet or attributed to the packet by the network device 100. For example, in one embodiment, the metadata set 125 includes ingress and/or egress interface information associated with the packet, such as a physical port at which the packet was received, an extended or virtual port (eport) that was assigned to the packet, a physical port from which the packet is to be transmitted, a virtual port to which the egress port corresponds, a VLAN associated with the packet or an extended or virtual VLAN (eVLAN) assigned to the packet by the network device 100 to associated the packet with a virtual domain within the network device 100, etc. Additionally, in an embodiment, the metadata set 125 includes various fields determined for the packet, such as various tags, flags (e.g., indicating presence or absence of a VLAN tag in the packet), etc. associated with the packet, a time-stamp generated for the packet, or other information associated with, generated, or calculated for the packet by the network device 100.

In at least some embodiments, the metadata set 125 generated for a packet generally includes a relatively large amount of data or information determined, calculated, or otherwise generated for the packet based on the processing of the packet by the network device 100 and/or packet information specific to the network device 100. The generated metadata set 125 is stored in a memory included in or coupled to the forwarding engine 104 of the network device 100 and is generally not passed among various pipeline units in the forwarding engine 104, in an embodiment. When the metadata set 125 is used as an anchor for a particular UDB, information is extracted from the metadata set 125 the UDB is populated with indicated information extracted from the metadata set 125. In an embodiment, the populated UDB is then included in a packet descriptor associated with the packet. Thus, in this embodiment, only a selected subset of packet data included in the metadata set 125 is passed along to downstream processing units. In an embodiment, the selected subset of data includes only the data included the user configured UDBs for the packet and generally does not include all of the packet data included in the metadata set 125. FIG. 3 illustrates an example UDB set 300 defined for a particular packet type supported by the network device 100 of FIG. 1, according to an embodiment. In an embodiment, the UDB set 300 corresponds to a row in the UDB pool configuration table 200 of FIG. 2. As illustrated in FIG. 3, each UDB included in the UDB set 300 is specified using an anchor and an offset, as described above with respect to FIG. 2. Thus, for example, UDB 0 in the UDB set 300 is defined using "L2 header" as the anchor, and 0 bytes as the offset. Accordingly, UDB 0 corresponds to the beginning of the L2 header of a packet. Thus, when populated, UDB 0 for a packet includes data from the first byte of the L2 header of the packet. Similarly, UDB 1 in the UDB set 300 is defined using "L2 header" as the anchor, and 1 byte as the offset. Thus, when populated, UDB 1 for a packet includes data from the second byte of the L2 header of the packet. As another example, UDB 3 in the UDB set 300 is defined using "metadata" as the anchor and 7 bytes as the offset. Thus, when populated, UDB 3 for a packet includes data from the seventh byte of a metadata set generated for the packet. In an embodiment, the UDB set 300 includes 60 UDBs defined for a particular packet type. In general a UDB set defined for a particular packet type can include any suitable number of UDBs, and the UDB set 300 includes another suitable number of UDBs in another embodiment.

Referring again to FIG. 1A, in operation, the TTI classification/UDB configuration unit 124 receives a packet or a packet descriptor associated with a packet form the header decode unit 122, and generates the metadata set 125 for the packet to include data generated for the packet by the network device 100. Then, the TTI classification/UDB configuration unit 124 populates appropriate UDBs defined in the UDB pool configuration table 126 with information related to the packet. To populate the appropriate UDBs for a packet, in an embodiment, the TTI classification/UDB configuration unit 124 accesses the UDB pool configuration table 126 using the packet type as an index to the UDB pool configuration table 126, and populates the UDBs defined for the packet type with information from the specified field in the packet and/or the specified fields in the metadata set 125 generated for the packet. In some embodiments, UDBs in the UDB pool configuration table 126 are defined differently for packets that correspond to different sub-formats of a same packet type, specifying desired data for the UDBs using the specific sub-format (e.g., the specific header sub-format). In some such embodiments, a corresponding index to the UDB pool configuration table 126 is generated using a rule-based scheme to identify the specific sub-format associated with a packet. For example, the TTI classification/UDB configuration unit 124 utilizes a rule-based generated index to access the UDB Pool configuration table 126 by retrieving an index to the UDB pool configuration table 126 from a TCAM (e.g., the TCAM 150) coupled to the TTI classification/UDB configuration unit 124, according to one such embodiment. In an embodiment, rule based indexing to the UDB pool configuration table 126 allows, for example for generation of an index for a packet based on a specific sub-format to which the packet corresponds. Thus, as an illustrative example, the UDB configuration table 126 includes differently defined UDBs for an MPLS packet depending on whether the MPLS packet is a standard MPLS packet or a MPLS traffic policing (MPLS-TP) packet. In this embodiment, the UDB configuration table 126 is indexed according to the specific MPLS packet sub-format.

In an embodiment, the TTI classification/UDB configuration unit 124, upon populating the UDBs for a packet as specified in the UDB pool configuration table 126, makes the populated UDBs available for use in processing units downstream from the TTI classification/UDB configuration unit 124, for example by including the populated UDBs in a packet descriptor corresponding to the packet or by storing the populated UDBs in a memory accessible by units downstream from the TTI classification/UDB configuration unit 124. In some embodiments, the UDBs populated for a packet by the TTI classification/UDB configuration unit 124 are then utilized for generating a policy control key for the packet, as explained in more detail below.

An ingress policy engine 128 coupled to the TTI classification/UDB configuration unit 124 generally allows Policy Control Lists (PCLs) to be applied to packets based on certain information included in or associated with the packets, according to an embodiment. In an embodiment, the ingress policy engine 128 is used to implement applications such as Access Control Lists (ACLs), Quality of Service (QoS), policy-based VLANs, policy-based switching or routing, etc. In an embodiment, the policy control engine 128 utilizes a TCAM (e.g., the TCAM 150) or other suitable lookup memory coupled to or included in the ingress policy engine 128. An entry in the TCAM 150 indicates a particular rule or set of one or more actions to be performed (e.g., with regard to access control, quality of service, flow measurements, VLAN assignments, etc.). In some scenarios, at least some of the actions to be performed are to be performed by processing units downstream from the ingress policy engine 128. Thus, in some scenarios, the ingress policy engine 128 assigns attributes to the packet to indicate to downstream processing units how the packet is to be processed, or what processing action or actions are to be performed with respect to the packet. In an embodiment, assigning an attribute comprises including an attribute indicator in the packet descriptor for the packet. The ingress policy engine 128 also includes, or is coupled to, one or more other memories, such as an SRAM or other suitable memory, in an embodiment. In this embodiment, an entry in the TCAM or other suitable lookup memory indirectly indicates a rule or set of one or more actions to be performed by providing an index to another memory component used to store the rules and actions to be performed, and determining a rule or action to be performed utilizes the one or more additional memory components such as the SRAM.

To gain access to the TCAM 150, for determining actions to be performed on a packet and/or attributes corresponding thereto, the ingress policy engine 128 determines a key based on information included in or associated with the packet, and utilizes the key to access the TCAM 150. In order to generate a key, the ingress policy engine 128 performs an initial lookup to determine a format for the key, in an embodiment. In an embodiment, the particular key format to be used for a packet is determined based on one of several parameters associated with the packet, where the particular parameter or parameters to be used for determining the key format depend on the particular configuration or mode of operation of the ingress policy engine 128.

The ingress policy engine 128 includes or is coupled to a memory that stores one or more PCL configuration tables 130. Each entry of the PCL configuration table 130 identifies a key format, in an embodiment. In some embodiments, different key formats are specified for different packet types supported by the network device 100, and the ingress policy engine 128 selects a key format for a packet based on the packet type of the packet. For example, the ingress policy engine includes and/or has access to a separate PCL configuration table 130 for each packet type supported by the network device 100, such as non Internet Protocol (non-IP) packets, Internet Protocol version 4 layered over address resolution protocol (IPv4/ARP) packets, Internet Protocol version 6 (IPv6) packets, etc. Alternatively, in another embodiment, the ingress policy engine 128 accesses a single PCL configuration table 130, where different portions of the PCL configuration table 130 correspond to different packet types supported by the network device 100. In this embodiment, the ingress policy engine 128 utilizes the packet type as an index to access a PCL configuration table 130 to determine a key format according that corresponds to the packet type.

In some embodiments, the PCL configuration table 130 includes, for each packet type, a first a set of predefined key formats and a second set of fully user defined key formats. According to an embodiment, the fully user defined keys are composed entirely of user defined bytes, and such keys are sometimes referred to herein as "UDB only" keys. According to an embodiment, the ingress policy engine 128 supports UDB only keys of several key sizes (e.g., 10 byte, 20 byte, 30 byte, 40 byte, 50 byte, 60 byte, etc.), and the PCL configuration table 130 includes, for each packet type, a UDB only key for each of the supported key sizes. FIG. 4 depicts a table 400 listing various ingress policy key formats available in the network device 100, in an embodiment. Each row in the table 400 corresponds to a particular format and indicates a key size that corresponds to the key format, and packet type or types to which the key format can be applied. The table 400 includes a first set of entries 402 of key formats that are at least partially preconfigured, and the corresponding entries in the table 400 indicate information from the packet to be included in keys generated according to the key formats. Additionally, the table 400 includes a second set 404 of fully user defined keys, or UDB only keys. Some or all of the key formats listed in the table 400 are included in the PCL configuration table 130, according to an embodiment.

In some embodiments, an entry specifying a UDB only key format in the PCL configuration table 130 includes a single bit key bitmap enable indication to indicate whether certain bits in the key format should be replaced with a bitmap spreading vector. According to some embodiments, when key bitmap is enabled for a key format (e.g., when the bitmap key enable bit is set to 1), the first 32 bytes of the key format are replaced with a bitmap vector spreading UDB 23, or $2^{UDB23}$, for example. In another embodiment, enabling of key bitmap results in replacement of other bytes in a key format and/or replacement of the bytes with other suitable bitmap spreading vectors. In an embodiment, spreading bytes in a key allows identifying specific bits (e.g., by masking the specific bits) to result in a match for a rule based on the specific identified bits. Providing a match determined according to only the selected bits in a byte, regardless of values of the masked bits in the byte, increases lookup memory utilization, in at least some embodiments, by reducing the overall number of rules that need to be stored in at least some situation.

Figure 5:
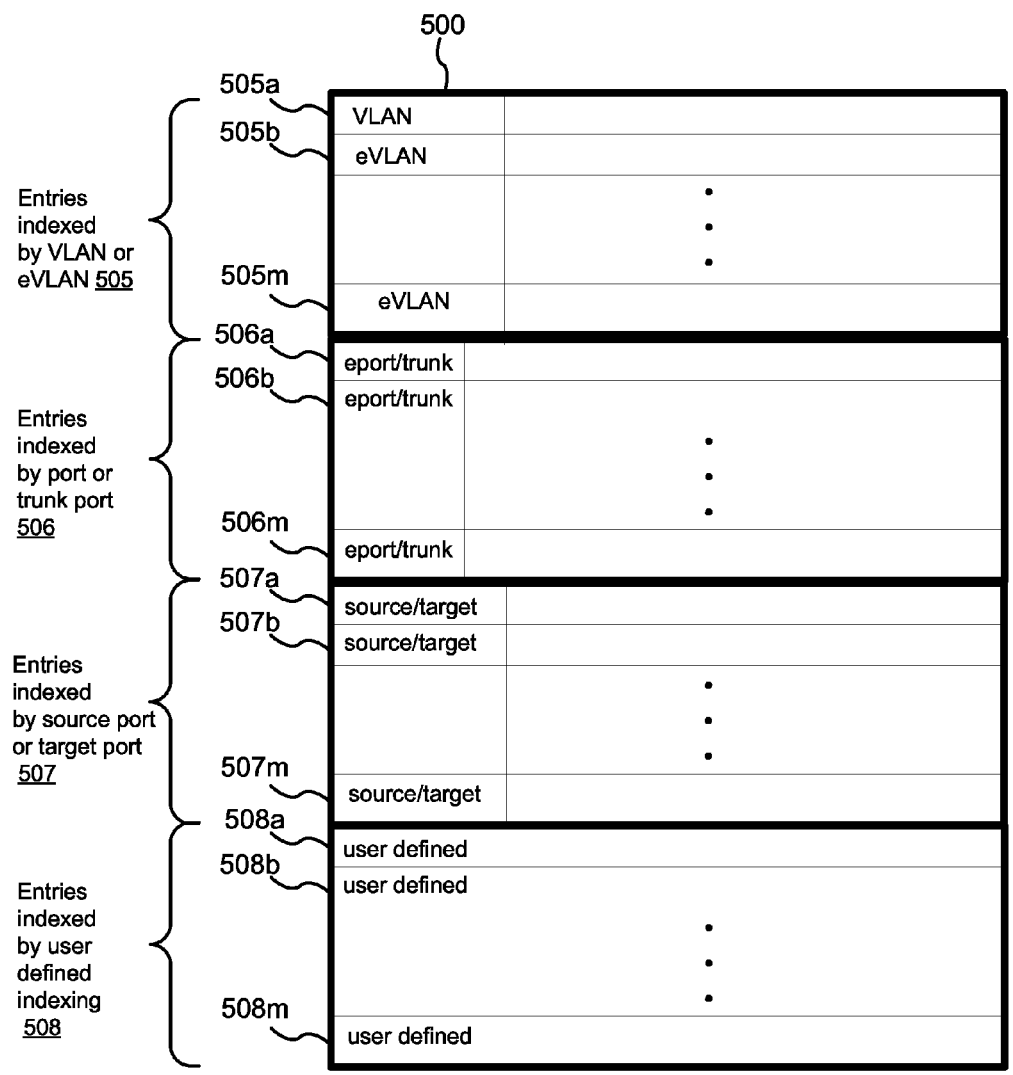
FIG. 5 depicts a policy control list (PCL) configuration table, according to one embodiment.

FIG. 5 depicts an example PCL configuration table 500, according to one embodiment. In an embodiment, the PCL configuration table 500 corresponds to the PCL configuration table 130 of FIG. 1A. In an embodiment, the PCL configuration table 500 indicates a correspondence between (i) one or a combination of parameters associated with a packet and (ii) a key format to be used for the packet. According to an embodiment, each entry of the PCL configuration table 500 includes an index and a plurality of fields of a corresponding key format. In some embodiments, the PCL configuration table 500 includes several sets of entries, and each set of entries is indexed according a different set of one or more packet parameters. Each set of entries corresponds to a particular mode of access to the PCL configuration table 500, in an embodiment. In the example embodiment of FIG. 5, the PCL configuration table 500 is accessible in a VLAN mode, a port or trunk port mode, a source extended port (eport) or target eport mode, or in a user configurable mode. Accordingly, as illustrated in FIG. 5, the PCL configuration table 500 includes a first set of entries 505 indexed based on eVLAN, a second set of entries 506 indexed based on a physical port, a trunk port, or a combination thereof, a third set of entries 507 indexed based on a source eport, a target eport, or a combination thereof, and a fourth set of entries 508 indexed based according to a user specified set of one or more attributes associated with data packets. In an embodiment, the ingress policy engine 128 generates an index to a particular entry of the PCL configuration table 500 based on the contents of one or more fields of the header of the packet and other information. Using the index, the ingress policy engine 128 obtains a corresponding key format from the particular entry, and generates the key according to the key format, in an embodiment.

Referring again to FIG. 1A, according to an embodiment, upon determining, based on the PCL configuration table 130, that a UDB only key format is to be used for a key, the ingress policy engine 128 generates the key using UDBs populated for the packet by the TTI classification/UDB configuration unit 124, in an embodiment. In an embodiment, the ingress policy engine 128 includes a PCL lookup selection table 131 that allows a user to specify, for each packet type supported by the network device 100 and for each UDB only key size supported by the ingress policy engine 128, specific UDBs to be included in a key and the order in which the specific UDBs should be placed in the key. Upon determining that a UDB only key of a particular key size is to be used for a packet, the ingress policy engine 128 accesses the PCL lookup UDB selection table 131, and generates the key by selecting specified UDBs from the set of UDBs defined for the packet in the UDB pool 126 and orders the selected UDBs according to the order specified in the PCL UDB lookup selection table 131.

In some embodiments, the TCAM 150 supports several ingress policy control lookup stages (e.g., three lookup stages or another suitable number of lookup stages) for a single packet, wherein each of the lookup stages returns one or several actions to the performed on the packet. In such embodiments, the ingress policy engine 128 generates a separate key for each of the several lookup stages, for example by accessing a separate PCL lookup UDB selection table 131 for each of the several lookup stages. Alternatively, in another embodiment, a single PCL lookup UDB selection table is provided, and the PCL lookup UDB selection table indicates, for each one of the lookup stages, UDB selections for each UDB key size and for each packet type supported by the network device 100. Accordingly, in this embodiment, the ingress policy engine 128 indexes the PCL lookup UDB selection table according to a {lookup stage, key size, packet type} tuple corresponding to a packet for which the key is being generated.

In an embodiment, the PCL lookup UDB selection table 600 indicates a different subset of UDBs to be selected for a first stage lookup key compared to the subset of UDBs to be selected for a second stage lookup. Accordingly, a key generated for the first lookup stage includes at least some UDBs not included in the key generated for the second lookup stage, in this embodiment. In another embodiment, the PCL lookup UDB selection table 600 indicates a same subset of UDBs to be selected for a first stage and a second stage lookups, however indicates different orderings of the selected UDBs. In this case, a key generated for a second stage lookup includes the same UDBs as the UDBs included on a key generated for a first stage lookup, but the UDBs in the second stage lookup key are ordered differently compared to the ordering of the UDBs in the first stage lookup key, in an embodiment. In this embodiment, to generate the second stage lookup key, the ingress policy engine 128 simply reorders the selected UDBs according to the ordering specified by the UDB selection table 600 for the second stage lookup key.

Figures 6A, 6B:
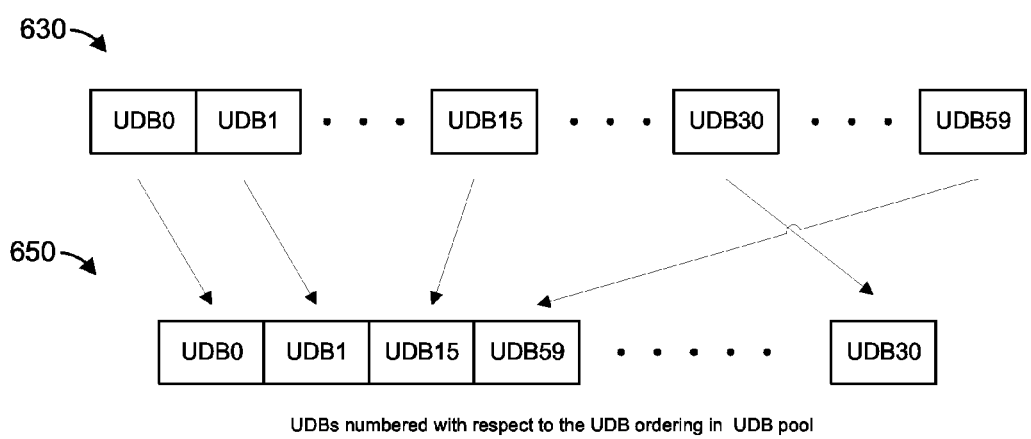
FIG. 6A illustrates an example table entry of a PCL lookup UDB selection table, according to an embodiment.
FIG. 6B illustrates a UDB set populated for a packet, and a key generated for the packet according to the UDB selection table entry of FIG. 6A, according to an embodiment.

FIG. 6A illustrates an example table entry 600 of a PCL lookup UDB selection table (e.g., the PCL lookup UDB selection table 130), specifying an example for a 40 byte UDB only key, according to an embodiment. The example table entry 600 specifies which ones of the UDBs populated for a packet as specified in the UDB pool configuration table 126 should be selected for generating a 40 byte key, and in which order the selected UDBs should be arranged to generate the 40 byte key. In the example embodiment of FIG. 6A, the UDB selection table entry 600 indicates that UDB 0 should be selected as the first UDB in the key, UDB 1 should be selected for the second UDB in the key, UDB 15 should be selected for the third UDB in the key, UDB 59 should be selected as the fourth UDB in the key, and so on. FIG. 6B illustrates a UDB set 630 generated for the packet by the TTI classification/UDB configuration unit 124 according to the UDB configuration table 126, and a key 650 generated for the packet according to the UDB selection table entry 600 of FIG. 6A. As illustrated in FIG. 6B, the ingress policy engine 128 generates the key 650 by selecting the UDBs indicated in the table entry 600 and ordering the selected UDBs as dictated by the table 600, in an embodiment.

Referring again to FIG. 1A, in some embodiments, the ingress policy engine 128 supports replacement of certain UDBs in a key generated for a particular lookup stage, for example with information related to the packet that may have changed in the process of processing the packet performed by the network device 100. Because such data is changed as a result of processing the packet by the network device 100, such data is not included in the metadata set 125 in at least some situations. The specific UDB numbers corresponding to UDBs to be replaced and the specific data to be used to replace the specified UDBs are configurable, in an embodiment. For example, a memory storing one or more UDB replacement tables 132 is included in or coupled to the ingress policy engine 128, with each UDB replacement table 132 indicating one or more UDBs to be replaced in a key when the key is generated for performing a lookup in a particular lookup stage, and what information related to the packet is to be used to replace the one or more UDBs. FIG. 7A illustrates an example UDB replacement table 700 listing configurable options to replace UDBs in a UDB only key. Thus, for example, the ingress policy engine 128 is configurable to replace one or two UDBs with PCL-ID information bits, to replace one or two UDBs with eVLAN identifier information bits, and so on. In the embodiment of FIG. 7A, the UDB replacement table 700 lists configurable options to replace up to 14 UDBs in a UDB only key. In other embodiments, the network device 100 supports replacement of a different number of UDBs and/or supports UDB replacements with device generated data other than the options listed in FIG. 7A. FIG. 7B illustrates an entry 720 of a UDB replacement configuration table (e.g., the UDB replacement configuration table 132 of FIG. 1A), according to an embodiment. The table entry 720 corresponds to a 40 byte UDB only key. The table entry 720 specifies UDB replacement configuration for a 40 byte UDB only key for a particular lookup stage (e.g., the $2^{nd}$ lookup stage), according to an embodiment. In the illustrated embodiment, a value of 0 in the generated data column of the table entry 720 indicates that the corresponding UDB should not be replaced.

In the example embodiment of FIG. 7B, the table entry 720 indicates that UDBs 0 and 1 are to be replaced with a policy control list identification (PCL-ID) associated with the packet (where UDB 0 is to be replaced with bits 0 through 8 of the PCL-ID, and UDB 1 is to be replaced with bits 8 and 9 of the PCL-ID), UDB 2 is to be replaced with an eVLAN identifier assigned to the packet, and UDB 39 is to be replaced with virtual routing and forwarding identification (VRF-ID) associated with the packet. In an embodiment, a replacement value of 0 in the table entry 720 indicates that the corresponding UDB should not be replaced. Thus, the table entry 720 indicates that UDB 3-UDB 5 should not be replaced, in the illustrated embodiment. FIG. 7C illustrates a UDB only key 730 generated for a packet based on the table entry 600 of FIG. 6A, and a UDB key 750 in which UDBs are replaced with generated data according to the table entry 720 of FIG. 7B, according to an embodiment. As illustrated in FIG. 7B, UDBs 0, 1, 2 and 39 in the key 750 are replaced, respectively, with PCL-ID [7:0], PCL-ID [9:8], eVLAN [7:0], and VRF-ID [11:8], as indicated in the table entry 720 of FIG. 7B.

Figure 8:
FIG. 8 depicts a table that lists internal key descriptor values and corresponding byte replacements used for a UDB only key in a debug mode, according to an embodiment.

Referring again to FIG. 1A, in some embodiments, the ingress policy engine 128 supports a debug mode in which UDBs in a key generated for a packet are replaced with information included in an internal descriptor for the packet. The internal descriptor for the packet is generated internally by the packet processor 102 and used only for debug operations in the network device 100, in an embodiment. In one embodiment, the ingress policy engine 128 is configurable to operate in debug mode and to generate keys according to the debug mode via an internal descriptor key enable indicator in the ingress policy engine 128. As an example, in one embodiment, the internal enable key indicator comprises three bits, with bit values indicating which bytes from the internal descriptor are to be used to replace UDBs in a UDB only key. FIG. 8 illustrates a table 800 that lists internal key descriptor values and corresponding byte replacements to be used for a 60 byte UDB only key, according to one embodiment.

Referring again to FIG. 1A, a bridge engine 133 is coupled to the ingress policy engine 128. The bridge engine 133 includes, or is coupled to, a forwarding database (not shown) that includes MAC destination addresses and indications of the corresponding egress ports to which packets having the MAC destination addresses should be forwarded. In one embodiment, the forwarding database includes a table of MAC destination addresses and indications of the corresponding egress ports. The bridge engine 133 performs MAC source address lookups and MAC destination address lookups, in some embodiments and in at least some scenarios.

In an embodiment, the bridge engine 133 generally uses Layer-2 information to determine to which port or ports a packet should be forwarded. Determination of whether, and to where a packet should be forwarded, is done by examining the MAC destination address of the packet and determining to which network segment the destination address corresponds using the forwarding database, in some instances. Also, other information is utilized as well in other embodiments and/or instances. For example, VLAN information is utilized in some embodiments and/or instances. For instance, the bridge engine 133 is capable of determining port destinations for Layer-2 multicast or broadcast packets using VLAN information, in some embodiments. The bridge engine 133 also maintains the forwarding database, in some embodiments. For instance, the bridge engine 133 learns a port to which a source MAC address of an ingressing packet corresponds by recording the port corresponding to the ingressing packet and associating the port with the source MAC address of the packet, in an embodiment. In another example, the bridge engine 133 learns a port to which a VLAN of an ingressing packet corresponds by recording the VLAN corresponding to the ingressing packet and associating the port with the VLAN of the packet, in an embodiment.

Packets processed by the ingress portion 106 are provided to the egress portion 108. For example, in an embodiment, a header alteration unit 134 in the egress portion 108 is coupled to the bridge engine 133 in the ingress portion 106. In some scenarios, an ingressing packet has a VLAN field and MAC field in the packet header, and in some scenarios, it is necessary to modify the VLAN field (e.g., depending upon the VLAN associated with the MAC DA) or to multicast the packet to destination devices in different VLANs. It is noted that, in some embodiments, modification of a packet header occurs upon ingress to the provider network or upon egress from the provider network. The header alteration unit 134 maintains information allowing a packet header to be appropriately manipulated to facilitate such multicast operations, in some embodiments. In some implementations, the header alteration unit 134 manipulates the packet header independently or in cooperation with other units of the egress portion 108. The header alteration unit 134 enables control of tagging for customer networks or other subnetwork implementations, in some embodiments. To support this functionality, the header alteration unit 134 is embodied in or comprises a lookup table, database, or other suitable data structure correlating packet attribute information, eVLANs, MAC addresses, and customer VLAN tagging preferences. Additionally, the header alteration unit 134 points to a tunnel start entry that provides information regarding the required external header for a packet, in some scenarios; in that regard, a tunnel start entry defines a tunnel to be used to transmit the packet across a provider network.

In an embodiment, to allow egress policy control to be properly performed for a packet egressing the packet processor 102, the header alteration unit 134 repopulates UDBs included in the packet according to the altered header information in the packet, for example. To this end, the header alteration unit 134 includes a UDB configuration table 136 which corresponds to (or is a copy of) the UDB pool configuration table 126 included in the TTI classification/UDB configuration unit 124, and a metadata set 135 generated for the packet, which may be the same as or different from the metadata set 125 generated for the packet by the TTI classification/UDB configuration unit 124. In an embodiment, upon receiving a packet and manipulating the header of the packet, the header alteration unit 134 accesses the UDB pool configuration table 136 according to the packet type of the packet, and populates UDBs specified for the packet in the UDB pool configuration table 136.

The header alteration unit 134 is coupled to an egress policy engine 138. The egress policy engine 138 generally determines a rule or a set of one or more actions to be performed on a packet egressing the network device 100. Similar to the ingress policy engine 128, the egress policy engine 138 includes or is coupled to one or more memories storing an egress PCL configuration table 140, and a PCL lookup UDB selection table 142, in an embodiment. In a manner similar to that previously described for the ingress policy engine 128, the egress policy engine 138 accesses the PCL configuration table 140 to determine a key format corresponding to the packet, in an embodiment. For example, the egress policy engine 138 indexes the PCL configuration table 140 based on information included in or associated with the packet to determine a value of a key format for the packet. In some embodiments, the PCL configuration table 140 includes, for each packet type, a first a set of predefined key formats and a second set of fully user defined key formats, or UDB only keys. According to an embodiment, the ingress policy engine 138 supports UDB only keys of several suitable sizes (e.g., 10 byte, 20 byte, 30 byte, 40 byte, 50 byte, 60 byte, etc.), and the PCL configuration table 140 includes, for each packet type, a UDB only key for each of the supported key sizes. FIG. 9 illustrates a table 900 listing various preconfigured and fully configurable egress policy key formats available in the network device 100 for different packet types supported by the network device 100, in an embodiment. Some or all of the key formats listed in the table 900 are included in the PCL configuration table 140, according to an embodiment. The table 900 includes a first set of entries 902 of key formats that are at least partially preconfigured, and the corresponding entries in the table 900 indicate information from the packet to be included in keys generated according to the key formats. Additionally, the table 900 includes a second set 904 of fully user defined keys, or UDB only keys.

When the determined key format is a UDB only key, the egress policy engine 138 populates the key using the PCL lookup UDB selection table 142 in a manner similar to that previously described for the ingress policy engine 128, in an embodiment. The key is used by the egress policy engine 154 to access the TCAM 150 or other suitable memory to determine one or more egress processing actions that are to be performed on the packet. In an embodiment, the PCL lookup UDB selection table 142 includes entries similar to the entry 500 of FIG. 5. In other embodiments, the PCL lookup UDB selection table 142 includes entries different from the entry 500 of FIG. 5. In some embodiments, while the ingress policy engine 128 supports, as described above, multiple TCAM lookups for a single packet and, accordingly, includes multiple PCL lookup configuration tables 132, the egress policy engine 138 supports only one TCAM lookup for a single packet and, accordingly, includes a single PCL lookup UDB selection table 142.

Similar to the manner that is described above with respect to the ingress policy engine 128, the egress policy engine 138 supports replacement of one or more UDBs in a key with packet data generated for the packet by the network device 100. In an embodiment, to facilitate configuration of UDB replacement in egress policy keys, the egress policy engine 138 includes or is coupled to a memory storing a PCL UDB replacement table 143 which specifies the UDBs to be replaced, and which data generated for the packet should be used to replace the specified UDBs. In another embodiment, the egress policy engine 138 omits the PCL UDB replacement table 143. For example, in one embodiment, the egress policy engine 138 does not support UDB replacement in egress policy keys. In another embodiment, the egress policy engine 138 supports UDB replacement that is preconfigured in the egress policy engine 138. For example, in some such embodiments, the egress policy engine 138 supports replacement of UDB 0 and UDB 1 with the PCL ID field, and does not support replacement of any other UDBs and/or replacement of UDBs with any other data. In one such embodiment, the egress policy engine 138 includes a configurable option that indicates whether the preconfigured UDBs should or should not be replaced with the preconfigured data in a specific key.

In some embodiments, the egress policy engine 138 supports a debug mode in which UDBs in a key generated for a packet are replaced with information included in an internal descriptor for the packet. The internal descriptor for the packet is generated internally by the packet processor 102 and used only for debug operations in the network device 100, in an embodiment. In one embodiment, the egress policy engine 138 is configurable to operate in debug mode and to generate keys according to the debug mode via an eternal descriptor key enable indicator in the ingress policy engine 138. As an example, in one embodiment, the internal enable key indicator comprises three bits, with bit values indicating which bytes from the internal descriptor are to be used to replace UDBs in a UDB only key, as illustrated in the table 800 of FIG. 8.

A port MAC transmit unit 144 is coupled to the egress policy engine 138. The port MAC transmit unit 144 generally implements media access control functions and forwards packets to appropriate egress physical ports 114.

Figure 10:
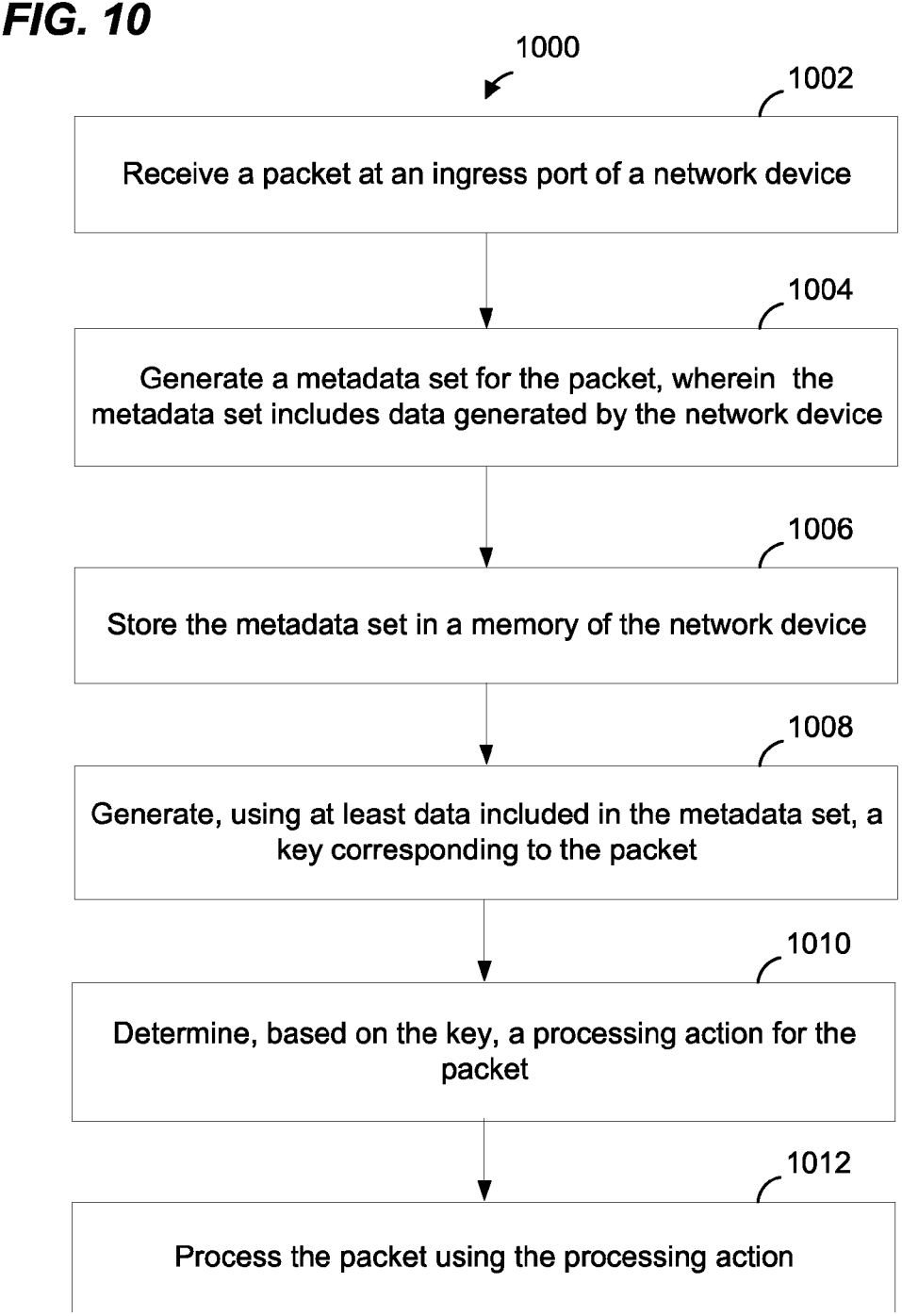
FIG. 10 is a flow diagram of an example method of processing packets in a network device, according to an embodiment.

FIG. 10 is a flow diagram of an example method 1000 of processing packets in a network device, in accordance with an embodiment of the disclosure. The method 1000 is implemented in the network device 100 of FIG. 1A, in an embodiment. The method 1000 is implemented in the network device 10 of FIG. 1, in another embodiment. In other embodiments, the method 1000 is implemented by another suitable network device other than the network device 100. The method 1000 is implemented by an ingress pipeline of a network device, by an egress pipeline of the network device, or by both the ingress and egress pipelines of the network device, in various embodiments. Alternatively, in some embodiments, the method 1000 is implemented by a forwarding engine that processes packets in a non-pipeline arrangement, for example by using a single processing unit configured to entirely process packets received by a network device.

At block 1002, a packet is received at an ingress port of the network device. For example, the packet is received at one of the ingress ports 112 of the network device 100, in an embodiment. At block 1004, a metadata set is generated for the packet. The metadata set is a set of data that includes data generated for the packet by the network device, in an embodiment. Referring to FIG. 1A, in an embodiment, the metadata set 125 is generated for the packet. In another embodiment, another suitable set of data is generated for the packet. In various embodiments, the metadata set includes one or more of an indication of the ingress port at which the packet was received, an indication of an egress port at which the packet is to be transmitted, an extended ingress and/or an extended egress port attributed to the packet by the network device 100, an indication of a VLAN associated with the packet, a timestamp generated for the packet, etc.

At block 1006, the metadata set generated at block 1004 is stored in a memory of the network device. In an embedment, the memory in which the metadata set is stored is included in or coupled to a UDB configuration unit (e.g., the TTI classification/UDB configuration unit 124 of FIG. 1A) included in the network device. At block 1108, a key corresponding to the packet is generated using at least data included in the generated metadata set stored in memory at block 1106. In an embodiment, the key is generated by a policy engine included in the network device. The policy engine generates the key using user defined bytes populated for the packet by the UDB configuration unit, in an embodiment. At least some of the user defined bytes are populated with data from the metadata set generated for the packet at block 1002. In an embodiment, the key generated at block 1008 is a UDB only key. In an embodiment, the key 650 of FIG. 6B is generated at block 1008. In another embodiment, another suitable key is generated at block 1008.

At block 1010, an action to be performed on the packet is determined based on the key generated at block 1008. In an embodiment, the action is determined by applying the key to a TCAM, such as the TCAM 150 of FIG. 1A. In another embodiment, the action is determined at block 1010, based on the key generated at block 1008, in another suitable manner.

In some embodiments, as the processing action is performed by some downstream entity in a pipeline used in processing the packet, an attribute or flag associated with the packet is set to indicate the processing action, in an embodiment. In another embodiment, the processing action or indication thereof is stored in a portion of memory accessible to the pipeline. Processing actions include, for example, trapping the packet, forwarding the packet, mirroring the packet, sampling the packet, using the packet to calculate statistics (e.g., a flow rate, a throughput, etc.), performing user defined processing actions, etc. In some embodiments, more than one processing action is determined at block 1010.

At block 1012, the packet is processed by the network device using the action determined at block 1010. In some embodiments, the processing action is performed based on the value of an attribute or flag set at block 1010. In some embodiments, the processing action is performed based on the indication of the processing action stored in the portion of memory at block 1010.

In some embodiments, the blocks 1004, 1006 are performed by an ingress pipeline of the network device. In a particular embodiment, the blocks 1004, 1006 are performed by the TTI classification/UDB configuration unit 124 included in the ingress portion 106 of the network device 100. In some embodiments, the block 1004, 1006 are performed by an egress processing pipeline. In a particular embodiment, the block 1004, 1006 are performed by the header alteration unit 134 included in the egress pipeline 108 of the network device 100.

In an embodiment, the metadata set generated at block 1006 is stored in a memory included in or coupled to the TTI classification/UDB configuration unit 124. In another embodiment, the metadata set generated at block 1006 is stored in a global memory of the network device 100, accessible by multiple ones of the ingress and/or egress processing units included in the network device 100. In one embodiment, for example, the metadata set generated at block 1004 is stored at block 1006 in a memory accessible by the header alteration unit 134 included in the egress pipeline 108 of the network device 100. In this embodiment, the blocks 1006, 1008 need not be performed in the egress pipeline portion 108.

In some embodiments, operation at blocks 1008, 1010 are performed by an ingress pipeline included in the network device. In a particular embodiment, the blocks 1008, 1010 are performed by the ingress policy engine 128 included in the ingress pipeline 106 of the network device 100. In some embodiments, the blocks 1008, 1010 are performed by an egress pipeline included in the network device. In a particular embodiment, the blocks 1008, 1010 are performed by the egress policy engine 138 included in the egress pipeline 108 of the network device 100.

Figure 11:
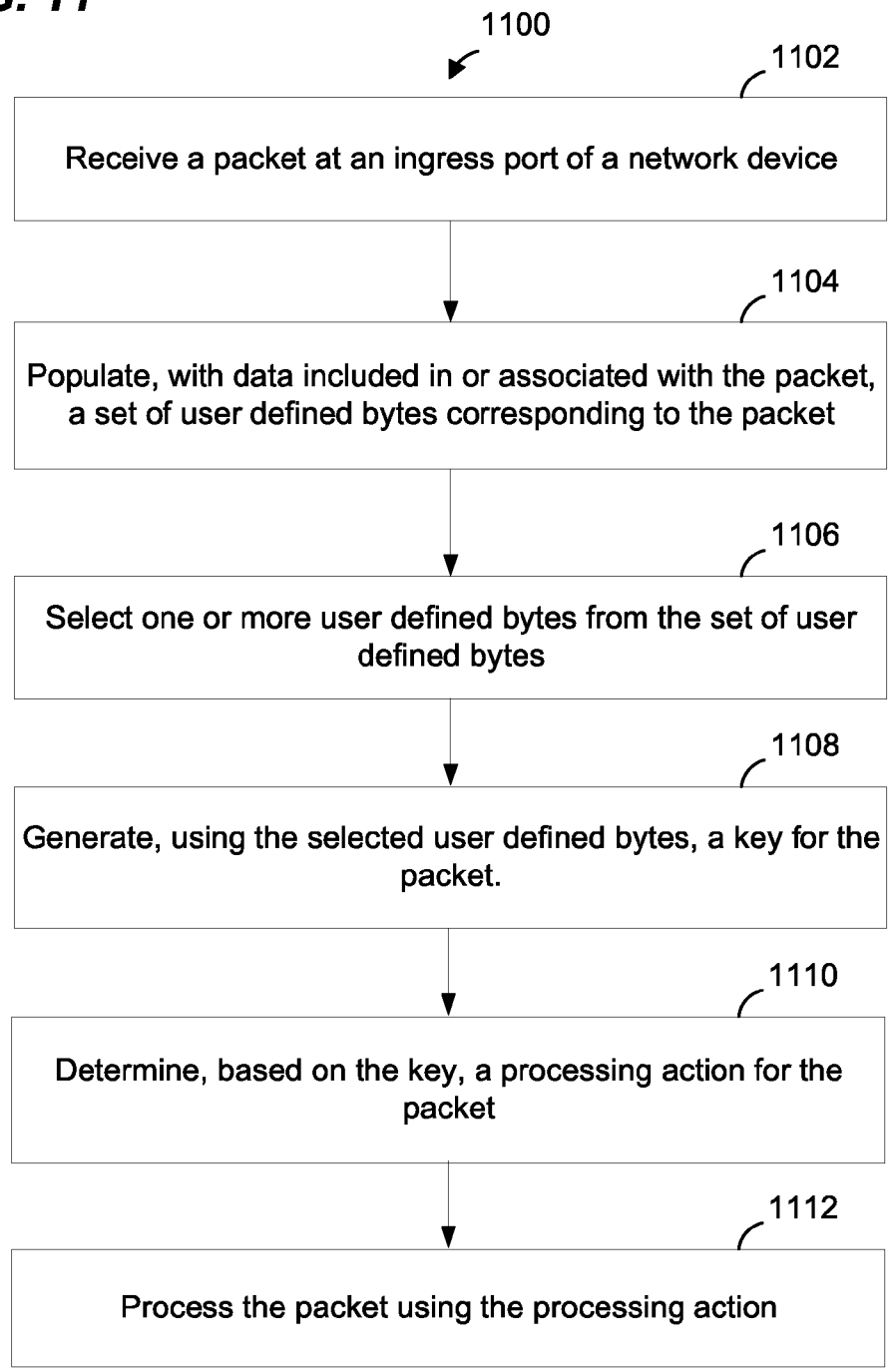
FIG. 11 is a flow diagram of another example method of processing packets in a network device, according to another embodiment

FIG. 11 is a flow diagram of another example method 1100 of processing packets in a network device, in accordance with another embodiment of the disclosure. The method 1100 is implemented in the network device 100 of FIG. 1A, in one embodiment. The method 1100 is implemented in the network device 10 of FIG. 1, in another embodiment. In other embodiments, the method 1100 is implemented by another suitable network device other than the network device 110. The method 1100 is implemented by an ingress pipeline of a network device, by an egress pipeline of the network device, or by both the ingress and egress pipelines of the network device, in various embodiments. Alternatively, in some embodiments, the method 1100 is implemented by a forwarding engine that processes packets in a non-pipeline arrangement, for example by using a single processing unit configured to entirely process packets received by a network device.

At block 1102, a packet is received at an ingress port of the network device. For example, the packet is received at one of the ingress ports 112 of the network device 100, in an embodiment. At block 1104, a set of user defined bytes are populated with data included in or associated with the packet. In an embodiment, the set of user defined bytes are populated according to a PCL global pool configuration table that includes a respective specification for each UDB populated at block 1104. Referring to FIG. 1A, for example, the set of user defined bytes is populated at block 1104 according to the PCL global pool configuration table 126 or the PCL pool configuration table 136, in an embodiment. As another example, referring to FIG. 2, the set of user defined bytes is populated at block 1104 according to the PCL global pool configuration table 200, in an embodiment. In a particular embodiment, the UDB set 300 of FIG. 3 is populated at block 1004. In another embodiment, another suitable UDB set is populated at block 1104. In an embodiment, populating the user defined byte set at block 1104 includes generating a metadata set (e.g., the metadata set 125) for the packet, and populating at least some of the user defined bytes in the set of user defined bytes using data included in the metadata set. In an embodiment, the set of user defined bytes populated for the packet at block 1104 are made available to downstream processing entities in a pipeline. For example, the populated set of user defined bytes is included in a packet descriptor for the packet, and the packet descriptor is sent to a downstream processing unit. In another embodiment, the populated set of user defined bytes is stored in a memory accessible by one or more downstream processing units in the pipeline.

At block 1106, one or more user defined bytes are selected from the set of user defined bytes generated at block 1104 for generating a key corresponding to the packet. In an embodiment, the one or more user defined bytes are selected according to a PCL lookup UDB selection table configured for the key being generated. Referring to FIG. 1A, for example, the one or more user defined bytes are selected according to the PCL lookup selection table 131 or the PCL lookup selection table 142, in an embodiment. In a particular embodiment, referring to FIG. 6A, the one or more user defined bytes are selected according to the PCL lookup selection table entry 600. In other embodiments, the user defined bytes are selecting using other suitable selection criteria.

At block 1108, a key for the packet is generated using the user defined bytes selected at block 1106. In an embodiment, the key is generated using only the user defined bytes selected at block 1106. The key is generated by ordering the selected user defined bytes according to the PCL lookup selection table used for selecting user defined bytes at block 1106, in an embodiment. In one example embodiment, the key 650 of FIG. 6B is generated. In another embodiment, another suitable key is generated using the user defined bytes selected at block 1106.

At block 1110, an action to be performed on the packet is determined based on the key generated at block 1108. In an embodiment, the action is determined by applying the key to a TCAM, such as the TCAM 150 of FIG. 1A. In another embodiment, the action is determined, based on the key generated at block 1108, in another suitable manner. In some embodiments, as the processing action is performed by some downstream entity in a pipeline used in processing the packet, an attribute or flag associated with the packet is set to indicate the processing action, in an embodiment. In another embodiment, the processing action or indication thereof is stored in a portion of memory accessible to the pipeline. Processing actions include, for example, trapping the packet, forwarding the packet, mirroring the packet, sampling the packet, using the packet to calculate statistics (e.g., a flow rate, a throughput, etc.), performing user defined processing actions, etc. In some embodiments, more than one processing action is determined at block 1110.

In some embodiments, operations at blocks 1106 are repeated to generate a second key corresponding to the packet, for example to perform a second stage lookup for the packet. In various embodiment, the subset of UDBs selected at block 1106 for the second lookup key is the same as or different from the subset of one or more UDBs selected at block 1106 for the first lookup key. When the subset of UDBs selected for the second key is the same as the subset of UDBs selected for the first key, the second key is generated by simply reordering the UDBs already selected for the first key, according to an embodiment.

At block 1112, the packet is processed by the network device using the action determined at block 1110. In some embodiments, the processing action is performed based on the value of an attribute or flag set at block 1110. In some embodiments, the processing action is performed based on the indication of the processing action stored in the portion of memory at block 1110.

In some embodiments, the blocks 1104 is performed by an ingress pipeline of the network device. In a particular embodiment, the blocks 1004 is performed by the TTI classification/UDB configuration unit 124 included in the ingress pipeline 106 of the network device 100. In some embodiments, the block 1104 is performed by an egress processing pipeline. In a particular embodiment, the block 1104 is performed by the header alteration unit 134 included in the egress pipeline 108 of the network device 100.

In some embodiments, the blocks 1106-1110 are performed by an ingress pipeline included in the network device. In a particular embodiment, the blocks 1106-1110 are performed by the ingress policy engine 128 included in the ingress pipeline 106 of the network device 100. In some embodiments, the blocks 1106-1110 are performed by an egress pipeline included in the network device. In a particular embodiment, the blocks 1106-1110 are performed by the egress policy engine 138 included in the egress pipeline 108 of the network device 100.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of processing a packet in a network device, the method comprising:
   receiving a packet at an ingress port of the network device;
   generating a metadata set for the packet, wherein the metadata set includes a plurality of data fields, wherein the plurality of data fields include respective data generated by the network device for the packet;
   storing the metadata set, which was generated for the packet, in a memory of the network device;
   extracting, from the metadata set stored in the memory, a subset of data to populate a plurality of user defined bytes for use in generating keys to be used in performing lookup operations with respect to the packet;
   storing, in a packet descriptor associated with the packet, the user defined bytes populated with the subset of data extracted from the metadata set;
   generating, using a subset of data included in the packet descriptor, a key corresponding to the packet, wherein the key is generated without using all data in the packet descriptor, and wherein generating the key includes
   selecting, from the user defined bytes in the packet descriptor, a subset of user defined bytes to be included in the key; and
   generating the key to include at least the selected subset of user defined bytes;
   determining, based on a lookup operation using the key, a processing action for the packet; and
   processing, by the network device, the packet using the processing action.

2. A method according to claim 1, wherein generating the key corresponding to the packet further comprises:
   ordering user defined bytes in the selected subset of user defined bytes according to an ordering specified for the key.

3. A method according to claim 1, wherein generating the key comprises including only the selected subset of user defined bytes in the key.

4. A method according to claim 1, wherein populating the plurality of user defined bytes comprises, for each user defined byte:
   using a first field associated with the user defined byte to determine a dataset corresponding to the packet; and
   using a second field associated with the user defined byte to locate a portion within the dataset.

5. A method according to claim 4, wherein the dataset corresponds to one of i) a header of the packet or ii) the metadata set corresponding to the packet.

6. A method according to claim 1, wherein generating the key includes replacing at least some data in the key with data generated for the packet by the network device.

7. A method according to claim 2, wherein the key is a first key and the ordering specified for the key is a first ordering, the method further comprising:
   generating a second key corresponding to the packet, including ordering the user defined bytes in the subset of user defined bytes according to a second ordering specified for the second key, wherein the second ordering is different than the first ordering;
   determining, based on the second key, an additional processing action for the packet; and
   processing, by the network device, the packet using the additional processing action.

8. A method according to claim 2, wherein the key is a first key and the subset of user defined bytes selected for the first key is a first subset, the method further comprising:
   selecting, from the plurality of user defined bytes, a second subset of user defined bytes for generating a second key corresponding to the packet, wherein the second subset includes at least some user defined bytes not included in the first subset;
   generating the second key to include at least the selected second subset of user defined bytes, including ordering user defined bytes in the selected subset of user defined bytes according to an ordering specified for the second key;
   determining, based on the second key, an additional processing action for the packet; and
   processing, by the network device, the packet using the additional processing action.

9. A method according to claim 1, wherein generating the metadata set includes including, in the metadata set, device specific interface data associated with the packet.

10. A network device, comprising:
a plurality of ports; and
a forwarding engine coupled to the plurality of ports, wherein the forwarding engine comprises:
a metadata generator configured to:
generate a metadata set for a packet, wherein the metadata set includes a plurality of data fields, wherein the plurality of data fields include respective data generated by the network device for the packet, and
store the metadata set, which was generated for the packet, in a memory of the network device; and
a policy control engine configured to:
extract, from the metadata set stored in the memory, a subset of data to populate a plurality of user defined bytes for use in generating keys to be used in performing lookup operations with respect to the packet,
store, in a packet descriptor associated with the packet, the user defined bytes populated with the subset of data extracted from the metadata set,
generate, using a subset of data included in packet descriptor, a key corresponding to the packet, wherein the key is generated without using all data in the packet descriptor, and wherein generating the key includes
selecting, from the user defined bytes in the packet descriptor, a subset of user defined bytes to be included in the key, and
generating the key to include at least the selected subset of user defined bytes, and
determine, based on a lookup operation using the key, a processing action for the packet;
wherein the forwarding engine is configured to process the packet according to the determined processing action.

11. The network device of claim 10, wherein the policy engine is included in at least one of i) an ingress processing unit of the network device and ii) an egress processing unit of the network device.

12. The network device of claim 10, wherein the policy control engine is configured to
generate the key at least by ordering user defined bytes in the selected subset of user defined bytes according to an ordering specified for the key.

13. The network device of claim 10, wherein the policy engine is further configured to determine the processing action for the packet based on applying the key to a lookup memory.

14. The network device of claim 10, wherein the policy engine is further configured to replace one or more user define bytes in the key with device generated data determined for the packet by the network device.

15. The network device of claim 12, wherein the key is a first key and the ordering defined for the first key is a first ordering, wherein the policy engine is further configured to:
generate a second key for the packet at least by ordering user defined bytes in the subset of user defined bytes according to a second ordering specified for the second key, wherein the second ordering is different than the first ordering;
determine, based on the second key, an additional processing action for the packet;
wherein the forwarding engine is further configured to process the packet using the additional processing action.

16. The network device of claim 12, wherein the key is a first key and the subset of user defined bytes selected for the first key is a first subset, wherein the policy engine is further configured to:
select, from the plurality of user defined bytes, a second subset of user defined bytes for generating a second key corresponding to the packet, wherein the second subset includes at least some user defined bytes not included in the first subset;
generate the second key to include at least the selected second subset of user defined bytes, including ordering user defined bytes in the selected subset of user defined bytes according to an ordering specified for the second key; and
determine, based on the second key, an additional processing action for the packet; and
wherein the forwarding engine is configured to process the packet using the additional processing action.

* * * * *